(12) United States Patent
Chiasson et al.

(10) Patent No.: US 6,888,120 B2
(45) Date of Patent: May 3, 2005

(54) SUNLOAD SENSOR FOR AUTOMOTIVE VEHICLES

(75) Inventors: Michel Chiasson, Lasalle (CA); Euan Davidson, Ulverston (GB); Jean Lacoursière, Cap-Rouge (CA); Simon Thibault, Sainte-Foy (CA); Theodore Petrea, Montreal (CA)

(73) Assignee: Silonex Inc., Montreal (CA)

( * ) Notice: Subject to any disclaimer, the term of this patent is extended or adjusted under 35 U.S.C. 154(b) by 0 days.

(21) Appl. No.: 10/159,979

(22) Filed: May 29, 2002

(65) Prior Publication Data

US 2003/0001074 A1 Jan. 2, 2003

Related U.S. Application Data

(60) Provisional application No. 60/293,521, filed on May 29, 2001.

(30) Foreign Application Priority Data

May 29, 2001 (CA) ............................................... 2349093

(51) Int. Cl.[7] ........................ G01C 21/02; G01C 21/24; G01J 1/20
(52) U.S. Cl. .................................... 250/203.4; 250/239
(58) Field of Search .......................... 250/203.4, 206.1, 250/206.2, 227.11, 239, 216, 574, 214 AL; 236/91 C, DIG. 15; 126/573, 578; 340/600, 425.5, 884; 356/222, 139.01; 165/43, 41; 454/75, 156, 900

(56) References Cited

U.S. PATENT DOCUMENTS

| | | | |
|---|---|---|---|
| 4,367,403 A | * | 1/1983 | Miller ...................... 250/203.4 |
| 4,491,727 A | | 1/1985 | Appelbaum et al. .... 250/203 R |
| 4,710,618 A | | 12/1987 | Matsumoto et al. .... 250/203 R |
| 4,890,460 A | | 1/1990 | Takasi et al. ................. 62/180 |
| 5,117,744 A | | 6/1992 | Zimmer et al. ................ 454/75 |
| 5,153,429 A | | 10/1992 | Takahashi .................... 250/239 |
| 5,181,654 A | | 1/1993 | Yoshimi et al. ........... 236/91 C |
| 5,337,802 A | | 8/1994 | Kajino et al. ................. 165/22 |
| 5,454,794 A | * | 10/1995 | Narciso et al. ............... 607/88 |
| 5,547,125 A | | 8/1996 | Hennessee et al. ........ 236/49.3 |
| 5,553,775 A | | 9/1996 | Kato et al. |
| 5,670,774 A | | 9/1997 | Hill .......................... 250/203.4 |
| 5,810,078 A | | 9/1998 | Knutsson et al. ........... 165/203 |
| 5,957,375 A | * | 9/1999 | West ........................ 236/91 C |
| 5,979,779 A | | 11/1999 | Asai et al. ................. 236/49.3 |
| 6,018,165 A | | 1/2000 | Kerkmann et al. ......... 250/574 |
| 6,084,228 A | | 7/2000 | Hill et al. ................. 250/203.4 |
| 6,087,650 A | | 7/2000 | Dage .................... 250/214 AL |
| 6,107,630 A | | 8/2000 | Mazurowski et al. .... 250/338.4 |
| 6,185,950 B1 | | 2/2001 | Baruschke et al. ........... 62/244 |
| 6,202,934 B1 | | 3/2001 | Kamiya et al. ........... 236/91 C |
| 6,297,740 B1 | * | 10/2001 | Hill et al. ................... 340/600 |

FOREIGN PATENT DOCUMENTS

| | | |
|---|---|---|
| EP | 0350866 | 1/1990 |
| WO | WO 9423277 | 10/1994 |
| WO | WO-99/24951 A1 | 5/1999 |

* cited by examiner

Primary Examiner—Thanh X. Luu
Assistant Examiner—Seung C. Sohn
(74) Attorney, Agent, or Firm—Darby & Darby

(57) ABSTRACT

A dual-channel sunload sensor capable of sensing the intensity and directionality of the solar radiative power entering the cabin of a car through the windshield, for the purpose of providing information to the data processing system of the car that enables a control of the air conditioning system that optimizes the comfort of the driver and of the front passenger. Signals from the sensor offer reliable indications of the solar load power and directionality for a wide range of angular positions of the sun. The sensor includes two convex transparent parts collecting light each toward a respective photodiode, the transparent parts being separated by an opaque portion.

14 Claims, 13 Drawing Sheets

SUNLOAD SENSOR FOR AUTOMOTIVE VEHICLES

CROSS-REFERENCE TO PREVIOUS APPLICATIONS

This application claims priority under 35 U.S.C. §119(e) of U.S. Provisional Patent Application Ser. No. 60/293,521, filed May 29, 2001.

FIELD OF THE INVENTION

The present invention relates to an apparatus to measure the solar radiative power that penetrates inside the cabin of a car through the windshield, and the predominant direction from which this radiative power load is coming, for the purpose of controlling the air conditioning of the car in a manner that maximizes the comfort of the passengers.

BACKGROUND OF THE INVENTION

Currently sunload sensors, either single- or dual-channel, are commercially available. Most are optoelectronic devices and use a silicon photodiode as a sensing element. A number of vehicle manufacturers have integrated into their products dual-channel sunload sensors in an attempt to provide improved temperature stability in the cabin, and comfort to the passengers. Dual-channel sunload sensors must provide not only a measurement of the total solar heat load entering the car through the windshield, but also an indication of which side of the car, the driver side or the passenger side, is subjected to more or less heat, so that cool air from the air conditioning system be preferentially distributed on the side that requires more.

Present dual-channel sensors do not however fully respond to the need that they at once provide a measurement of the total heat load entering the cabin, and of the relative distribution of this radiative heat load on the driver and on the passenger, especially when the sun is at an angular position that is low with respect to the horizontal plane of the vehicle. Typically, when the sun is low, the total heat load is under-estimated, and the comparative signal of the two channels becomes an unreliable indicator of the relative fractions of the heat load that are affecting the two sides of the cabin.

In addition, some present dual-channel sensors require the presence of sensing elements that are mounted at some angle from one another, a feature that renders their fabrication more complex and costly.

SUMMARY OF THE INVENTION

It is a primary object of this invention to provide a dual-channel sunload sensor capable of generating output signals that are reliable indicators of the total solar heat load entering a vehicle through the windshield, and of the relative fractions of the radiative heat loads that are perceived by the driver and by the passenger, for almost all angular positions of the sun.

In accordance with the invention, this object is achieved with a dual sunload sensor to sense the intensity and directionality of solar radiative power entering the cabin of a vehicle through a windshield, said sensor comprising:
 a housing;
 a substrate bearing two light sensitive semiconductor elements thereon housed in said housing;
 two lenses, one lens being located above a light sensitive semiconductor element, the other lens being located over the other light sensitive semiconductor element; and an optically opaque wall separating the two lenses.

The geometry of the sensor is such that it can be constructed economically, as the sensing elements of the two channels rest in the same plane. The output signals from the sensor can be used to control the temperature and distribution of cool air in cars equipped with an air conditioning unit.

DESCRIPTION OF THE DRAWINGS

This and other advantages of the invention will become apparent from a reading of the following detailed description made with reference to the following drawings in which.

DETAILED DESCRIPTION OF THE INVENTION

Referring now to the following Figures, the present invention concerns a sunload sensor 10. The sensor 10 consists of the following basic components. A flat substrate 1 commonly used for the manufacture of electronic circuits, either a printed circuit board made of composite material, or a ceramic material, bears circuit metallization (not shown) printed on the substrate by typical methods known in the art. Two silicon photodiode chips 2 are mounted on this substrate circuit, to serve as sensing elements for solar radiation.

Figure 7:
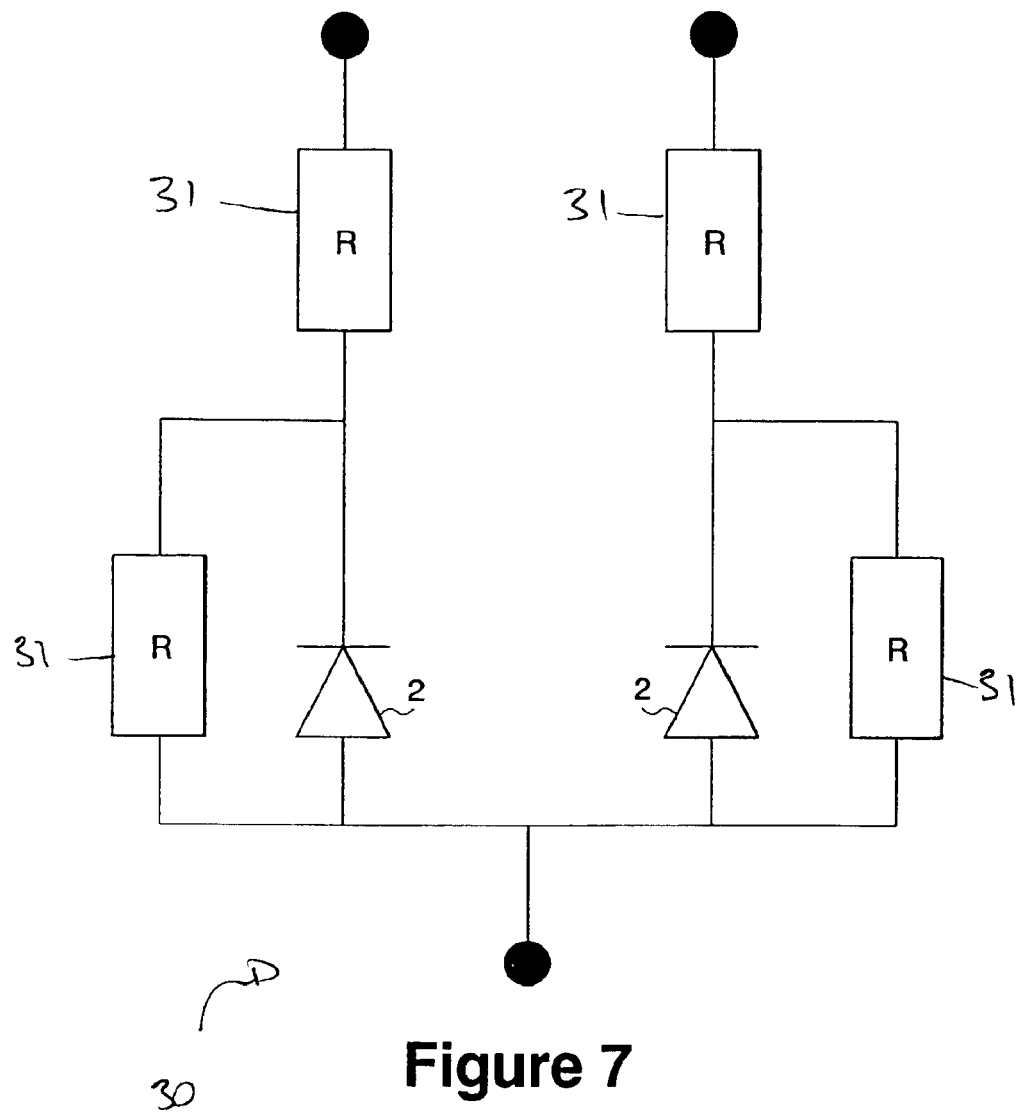
FIG. 7 is a circuit diagram of a preferred embodiment of the invention, where the signal conditioning electronics is entirely passive.
Figure 8:
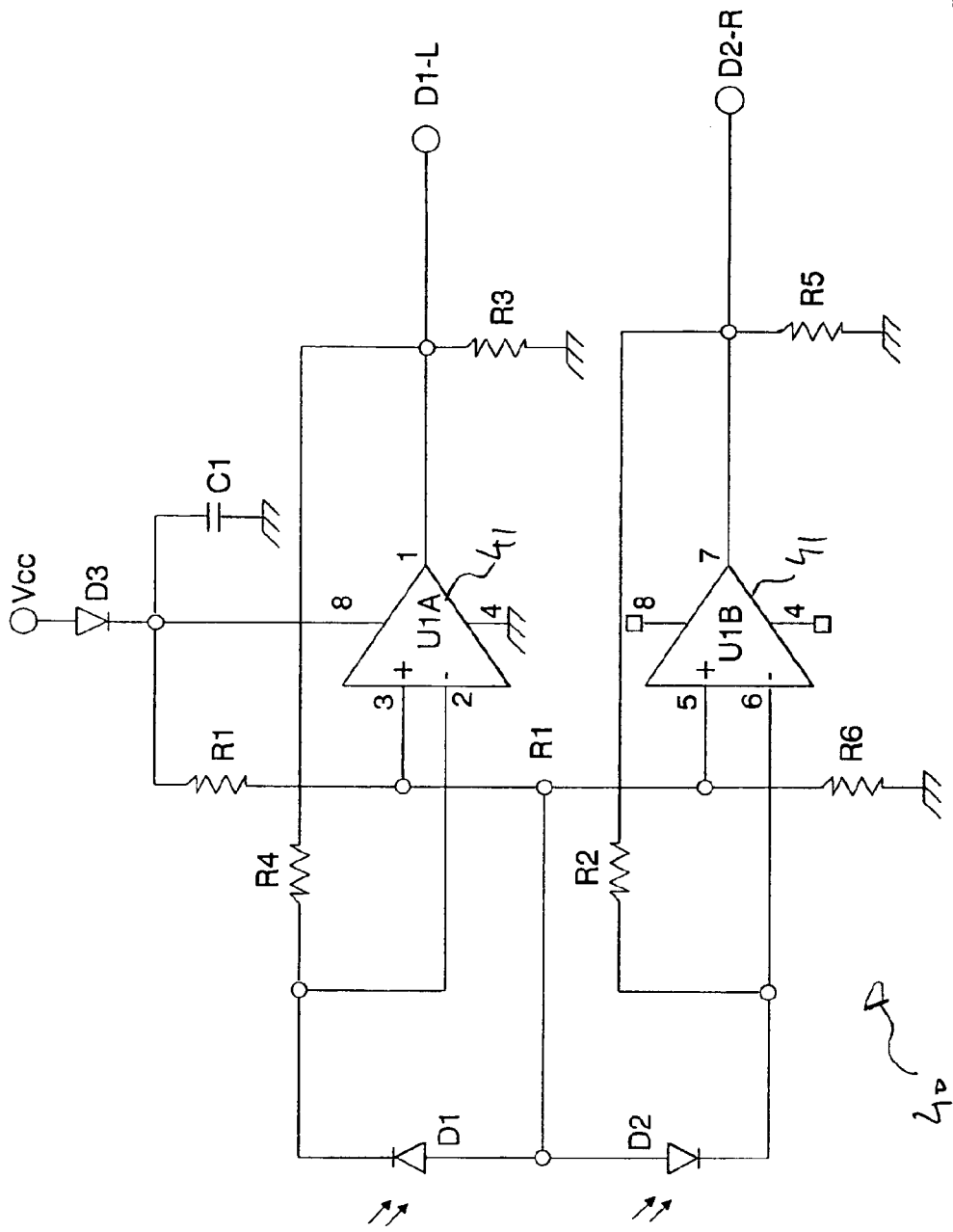
FIG. 8 is a circuit diagram of an alternative embodiment of the invention, where the signal conditioning electronic circuit is an active circuit comprising amplifiers.

It should be understood that, optionally, other electronic components can be mounted on the same substrate, to tailor the signal of the photodiodes 2 to the specific requirements of the electrical circuitry used in a particular vehicle mode Such electronic components may particularly include capacitors, amplifiers and resistors, including the printed thick film version of the latter. Circuit diagrams for two alternative versions of such conditioning electronics are shown in FIGS. 7 and 8. FIG. 7 shows a circuit 30 that is entirely passive, where each of the photodiodes 2 is accompanied by appropriate resistors 31 both in parallel and in series. The output of the circuit is at the top of the Figure. The passive components can be thick film resistors that can be laser trimmed to precisely balance the output from the two channels of the sensor 10.

Alternatively, FIG. 8 shows an active circuit 40 including op-amps for conditioning the signal. It will, however, be appreciated that any appropriate circuit will meet the objects of the present invention.

Figure 9:
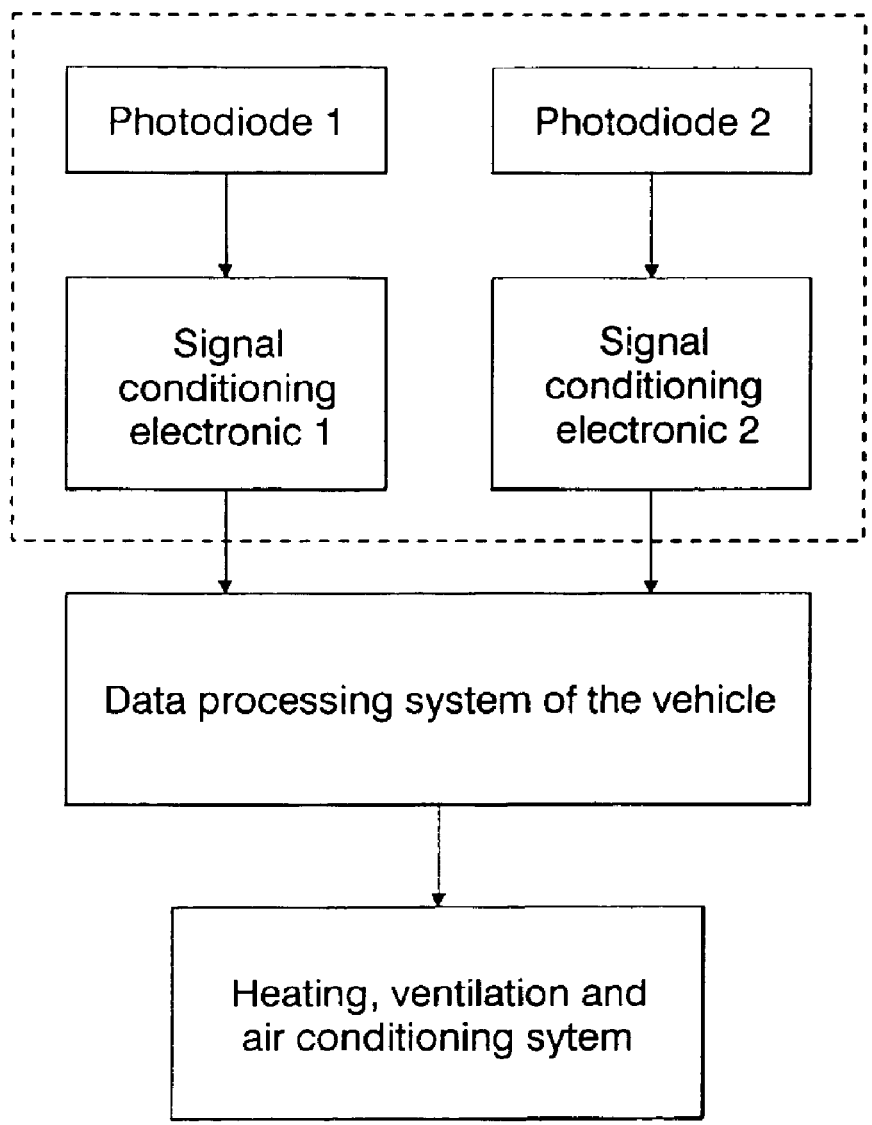
FIG. 9 is a block diagram that illustrates how the sensor related to the data processing and the HVAC system of the vehicle. The dashed line indicates the boundary of the sensor itself.

An electrical interface links the sensor 10 internal circuitry to the external circuitry of the vehicle, so that electrical signals provided by the two photodiode sensing elements 2, and suitably conditioned by the electronics comprised in the sensor 10, are made separately available to the external circuitry of the vehicle (FIG. 9 illustrates how these signals relate to the data processing and the heating, ventilation and air conditioning systems of the vehicle). It will be appreciated that each vehicle manufacturer, and indeed each different type of vehicle, will have proprietary external circuitry to control the heating, ventilating and air conditioning system of the vehicle, and that appropriate interface circuitry is required to properly interface with the external circuitry. However, such a design is within the skill of a person versed in this field, and beyond the scope of the present invention. The present invention deals with a solution for properly discriminating between driver side and passenger side reception of solar radiation by optically isolating the respective photodiodes, and advantageously, with being able to measure radiation although the sun is low on the horizon.

Figure 1:
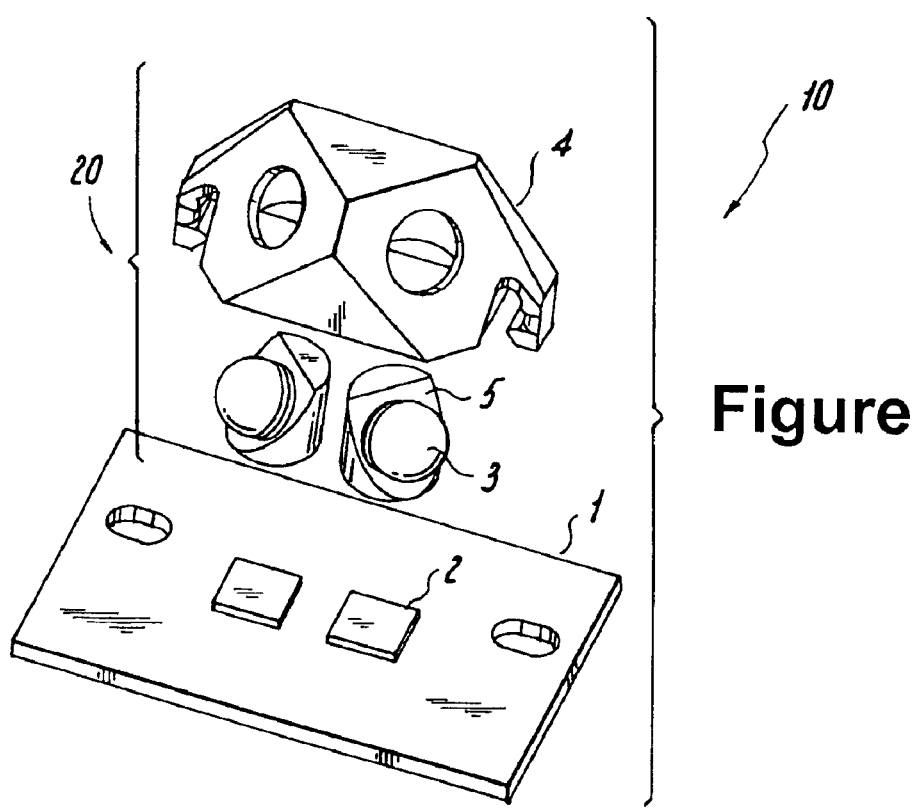
FIG. 1 is an exploded view of a sunload sensor according to a preferred embodiment of the invention.
Figure 10A:
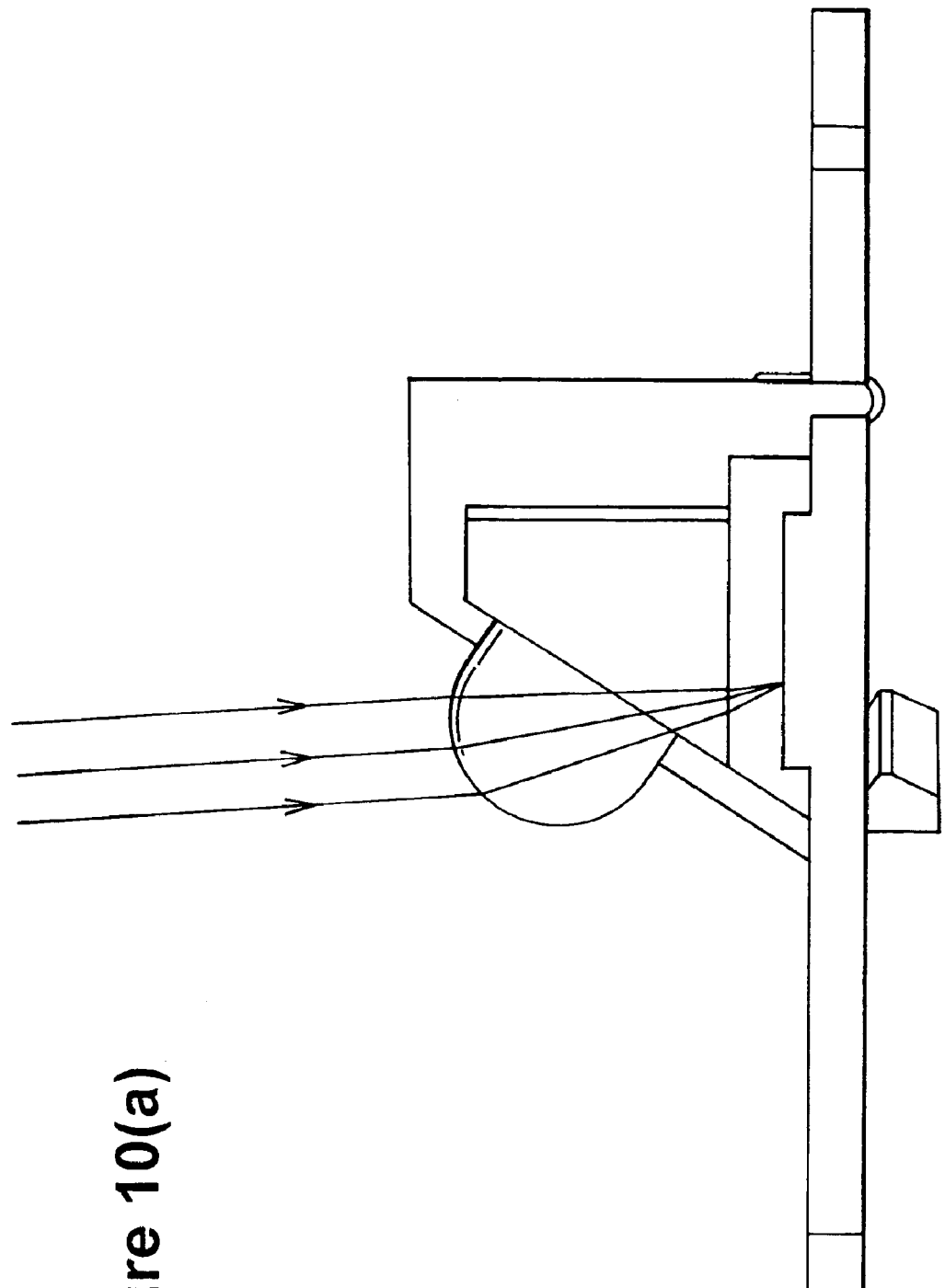
FIGS. 10a, 10b and 10c are schematic representations of the paths the light travels towards a photodiode according to a preferred embodiment of the invention, when no diffuser is present, and when the sun is high above horizon (FIG. 10a), moderately high above the horizon (FIG. 10b) and low on the horizon (FIG. 10c).
Figure 10B:
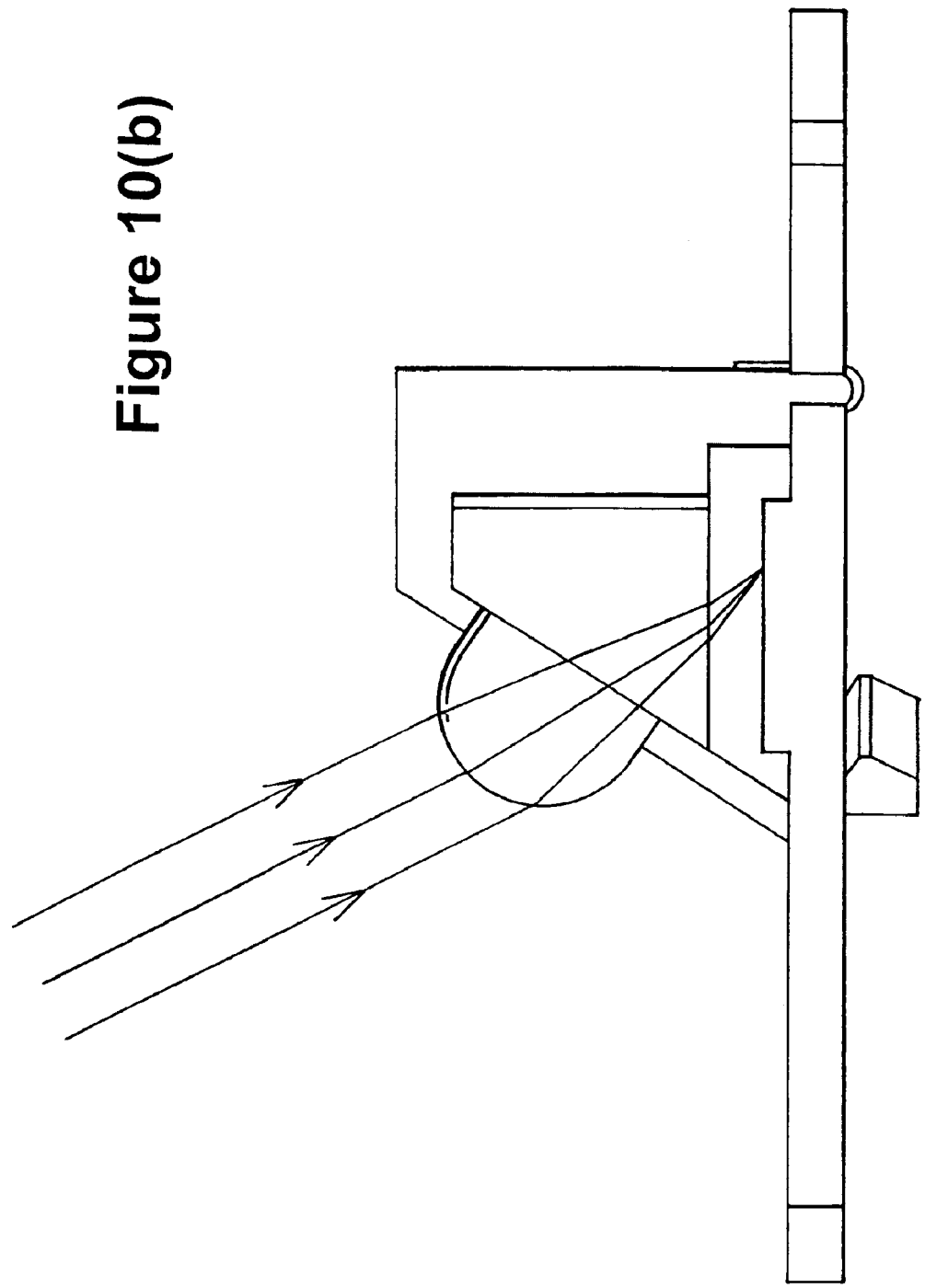
Figure 10C:
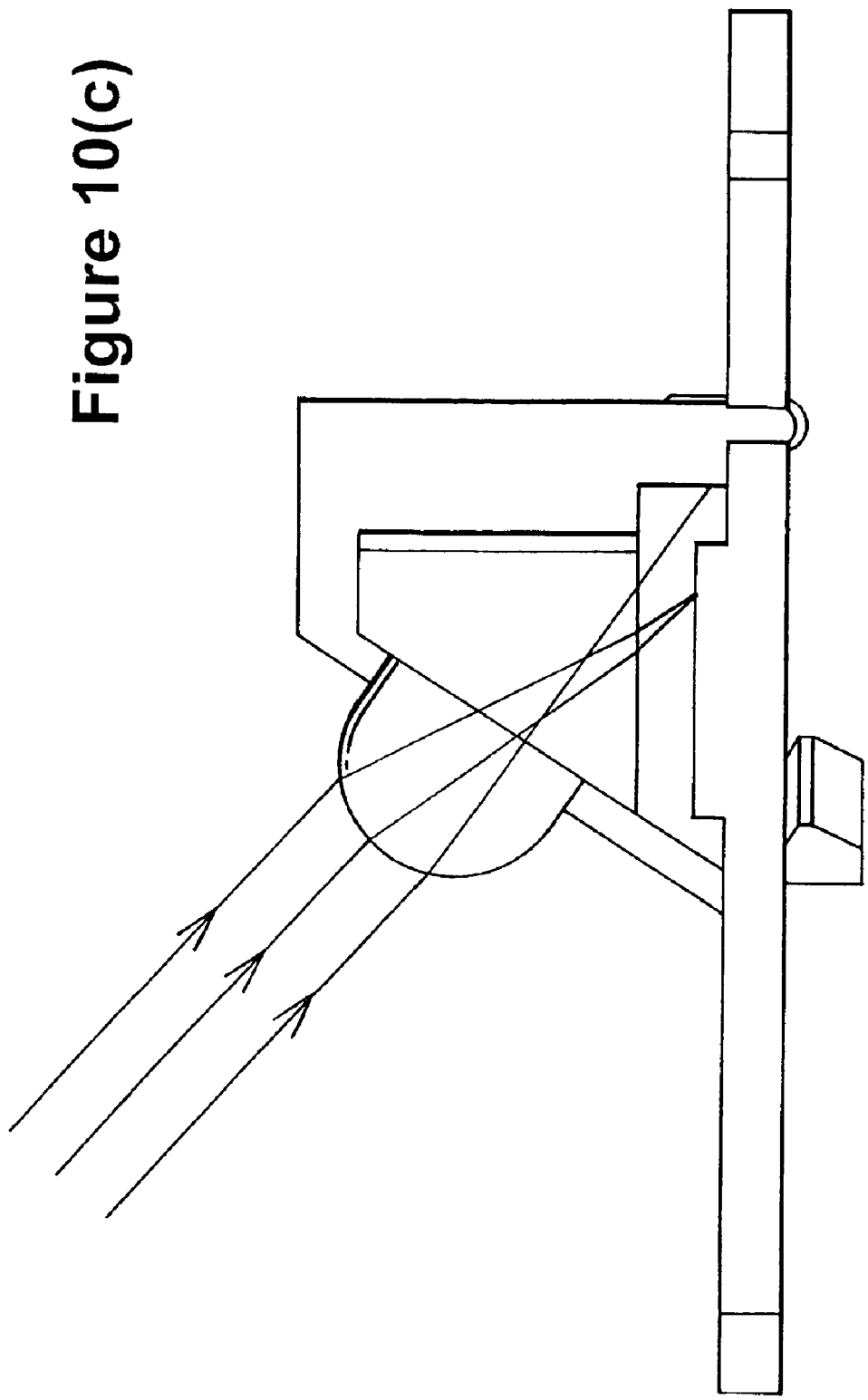

The circuit and photodiodes are mounted in a housing 20. The housing comprises two distinct transparent areas 3 on its top part, held and separated by an opaque section 4 lying in a vertical plane parallel to a longitudinal axis 101 of a vehicle 100. The transparent areas have external convex shapes (better seen in FIG. 1) that collect solar radiative power by refracting light coming from one side of a plane bisecting the sensor 10 to a respective sensing photodiode 2. An aspect of the shape of the transparent areas is that the light received is guided and collected to the appropriate photodiode notwithstanding the angular position of the sun on the horizon. Stated differently, the transparent areas act as a beam deflector, so that even if the sun is a few degrees above horizon, the near totality of the light will reach the photodiode. This requires optics that are within the skill of a person expert in this field, and schematic representations of the path followed by the light are shown in FIGS. 10*a*, 10*b* and 10*c*. In FIG. 10*a*, the sun is high above the horizon, whereas in FIG. 10*b*, the sun is moderately high above the horizon and in FIG. 10*c*, the sun is low on the horizon.

Figure 2:
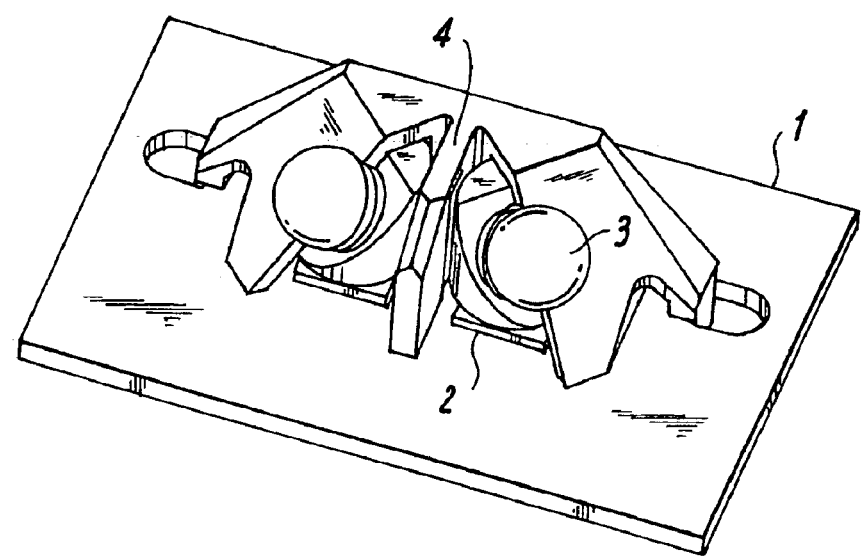
FIG. 2 is a cutout view showing the internal opaque wall between the clear areas of the housing of the sensor of FIG. 1.
Figure 3:
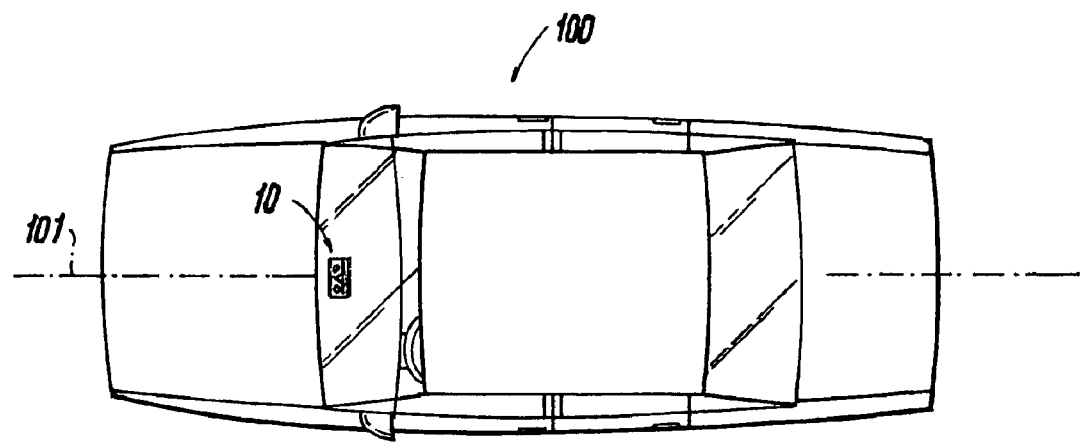
FIG. 3 is a diagrammatic view of the sensor as located in a vehicle.
Figure 4:
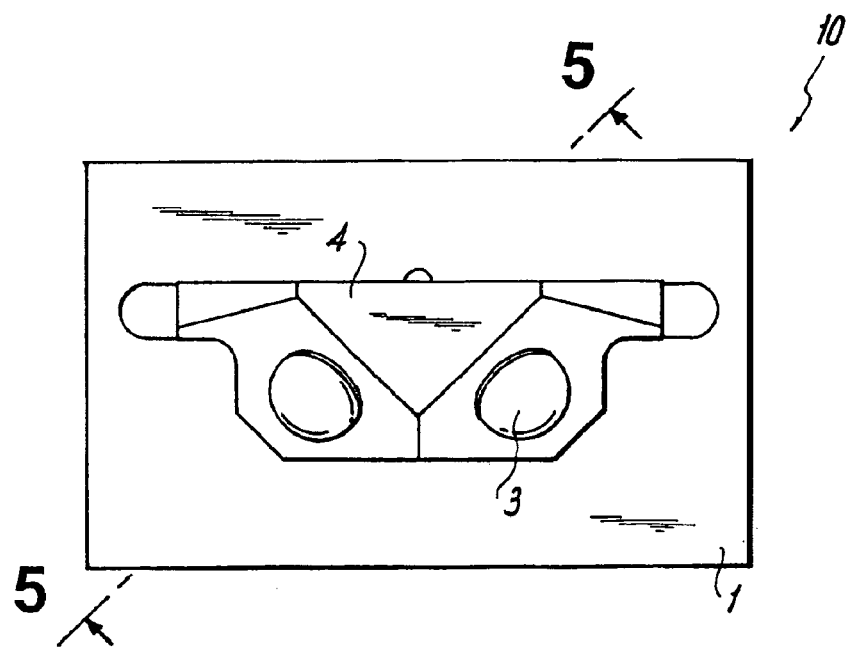
FIG. 4 is a top view of the sunload sensor of FIG. 1.

In a preferred embodiment of the invention, the driver-side transparent area 3 guides light to the driver-side photodiode 2, and the passenger side transparent area 3 guides light to the passenger side photodiode 2. Optionally the transfer of light from the convex shaped transparent areas 3 to the photodiodes 2 can be improved by the introduction between them of a piece of clear plastic having the shape of a truncated cylinder 5, better shown in FIGS. 1 and 2.

Figure 13A:
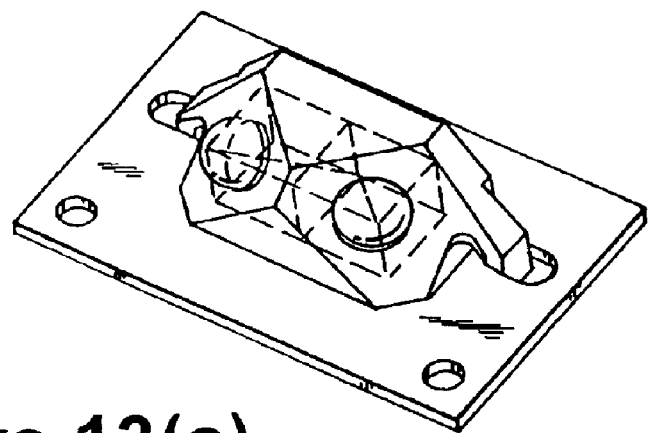
FIG. 13 illustrates that the optical axes of the lenses are aligned along the diagonals of virtual cubes resting on the sensing elements, according to a preferred embodiment of the invention.
Figure 13B:
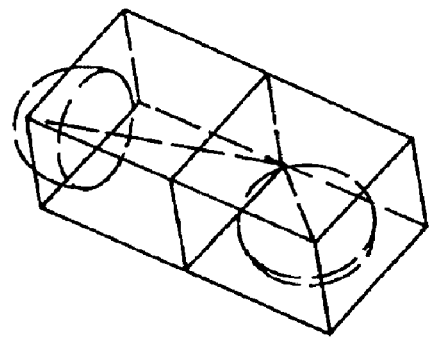
Figure 13C:
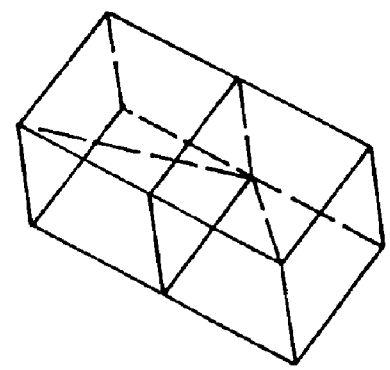

In a preferred embodiment of the invention, the optical axes of the transparent areas 3 are inclined in a direction corresponding substantially to the diagonals of virtual cubes resting in the plane of the sensing elements. This is better shown in FIGS. 13*a*, 13*b* and 13*c*.

The exact shape of the transparent and opaque parts can be adjusted to obtain an output-signal versus sun-angular-position relationship adapted to the particular requirements of a given application. FIGS. 1 through 5 illustrate the shapes of these parts in one embodiment.

Figure 5:
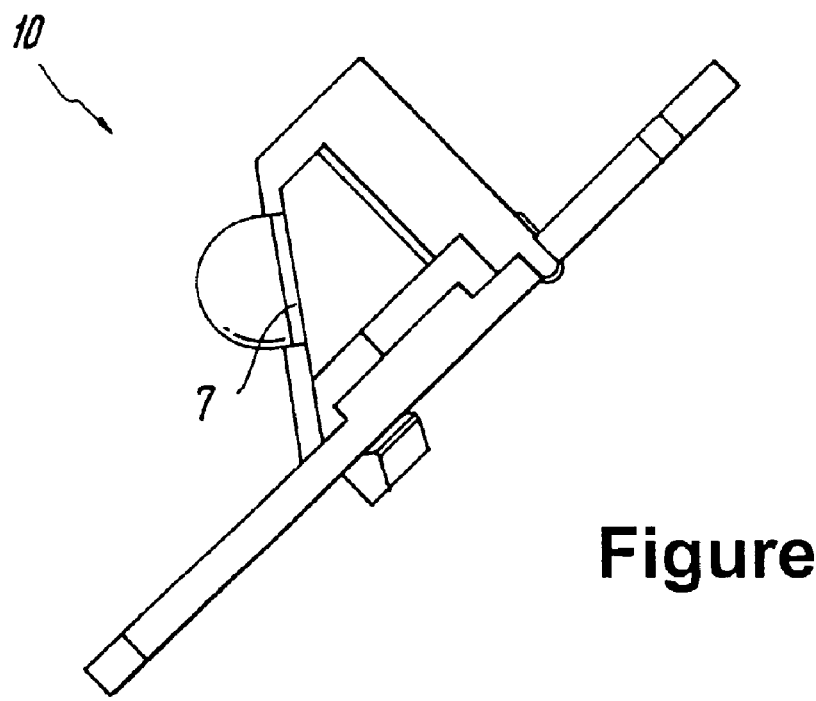
FIG. 5 is a diagonal cutout view of the sensor of FIG. 1 showing the internal shapes of the transparent, diffusive and opaque sections of the plastic housing, in a plane whose position is shown in FIG. 4.
Figure 11A:
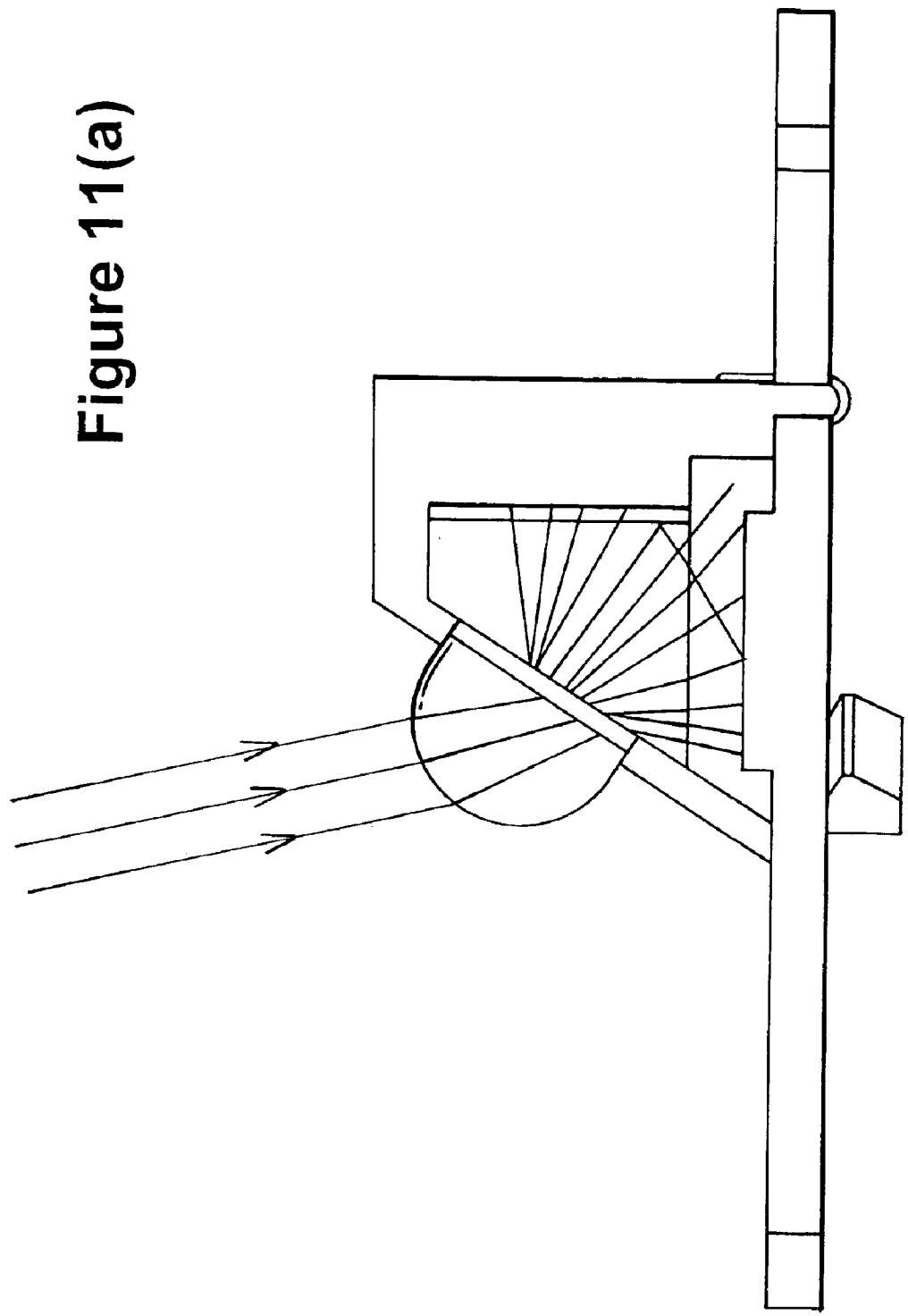
FIGS. 11a and 11b are schematic representations of the paths the light travels towards a photodiode according to another preferred embodiment of the invention, when a diffuser is present at the base of the lens, when the sun is high above horizon (FIG. 11a) and low on the horizon (FIG. 11b).
Figure 11B:
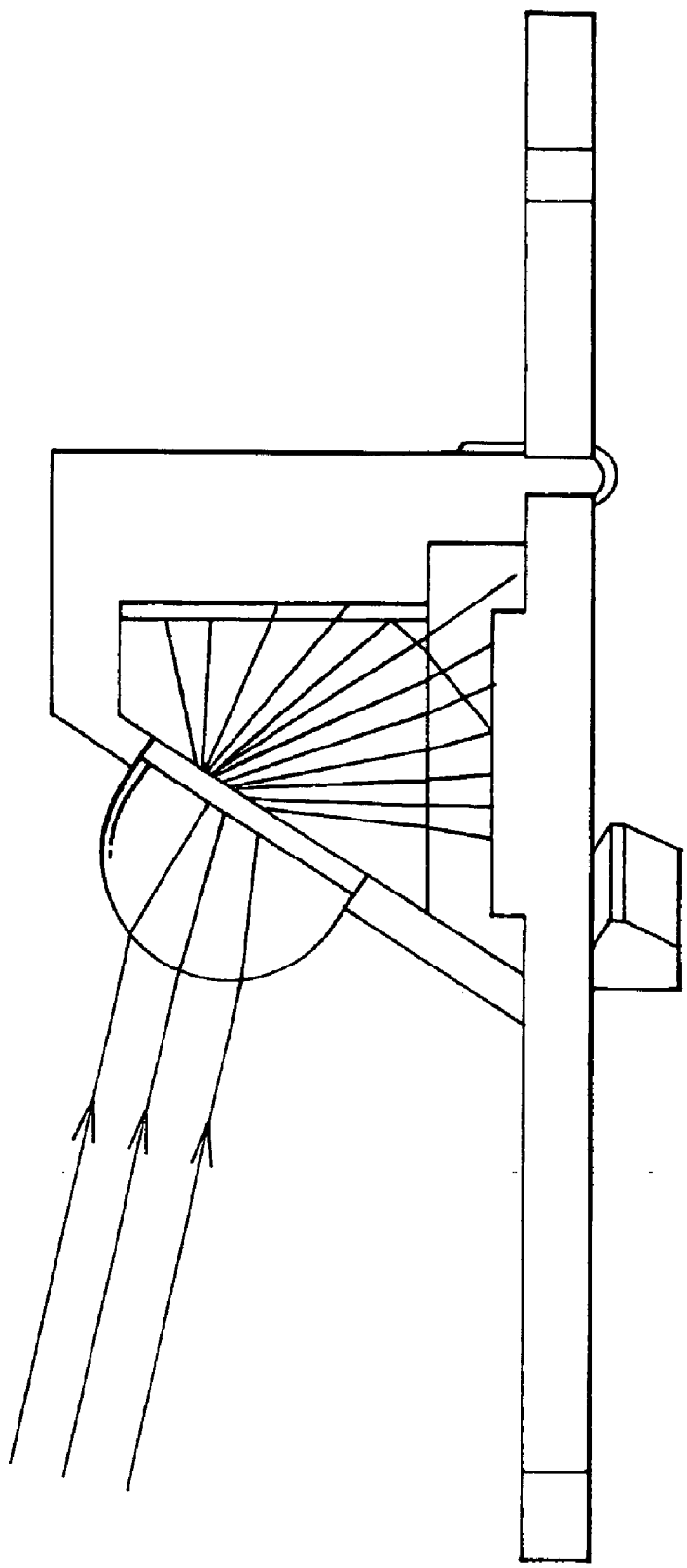
Figure 12:
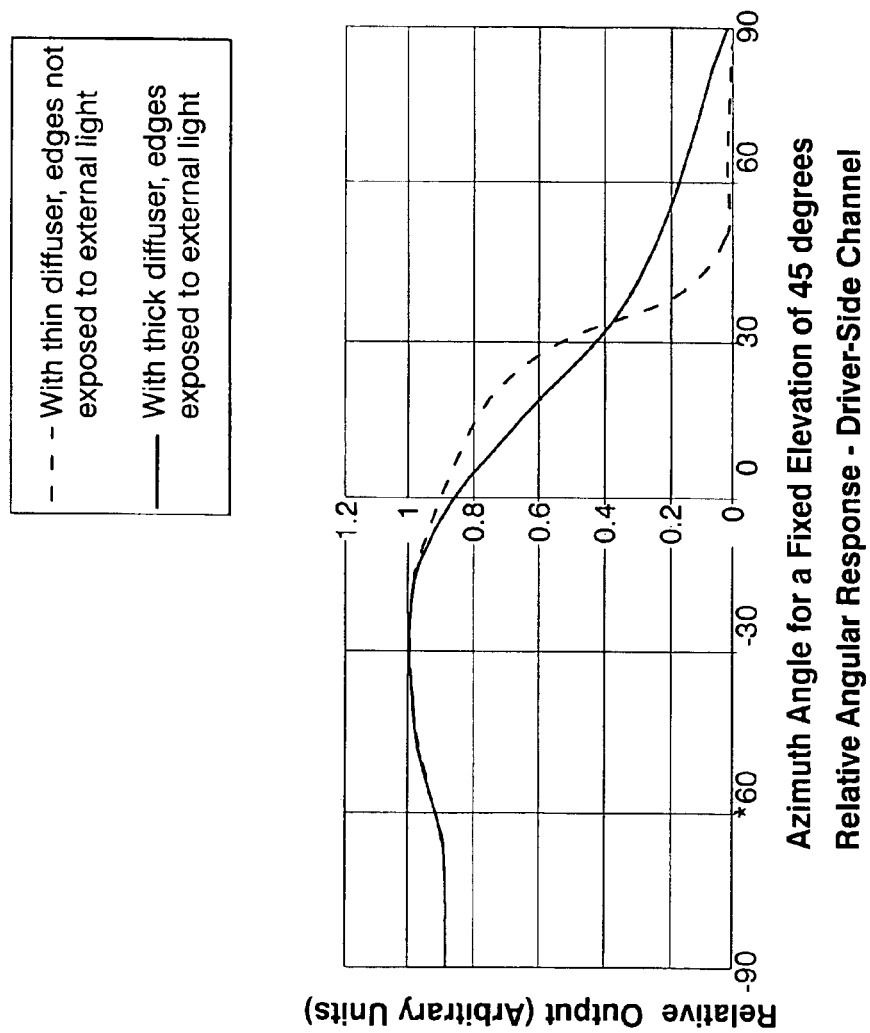
FIG. 12 illustrates a typical angular response for the driver-side channel, when a thin diffuser is present at the base of the lens, its edges not exposed to external sunlight (dashed line); and when a thicker diffuser is present, its edges directly exposed to external sunlight (solid line).

Optionally, a layer of diffusive plastic material 7, shown on FIG. 5, can be added at the base of the transparent plastic parts with external convex shapes, such that light collected by the convex parts is diffused towards the sensing element. This can serve to broaden and smooth out the angular dependency of the sensor output. FIGS. 11*a* and 11*b* illustrate schematically the paths of light for two different angular positions of the sun, when such a diffuser is present. FIG. 12 illustrates the resulting relative output signal of the driver-side channel, as function of the angular position of the sun. The layer of light diffusive material preferably consists of clear polymer in which grains of titanium dioxide are dispersed, the density and dimensional distribution of grains being selected so as to optimize the Rayleigh scattering of light. The dashed curve on FIG. 12 illustrates how the output of the driver-side channel of the sensor varies with the angular azimuthal position of the sun, for one value of the elevation angle, for this particular embodiment of the invention.

Figure 6:
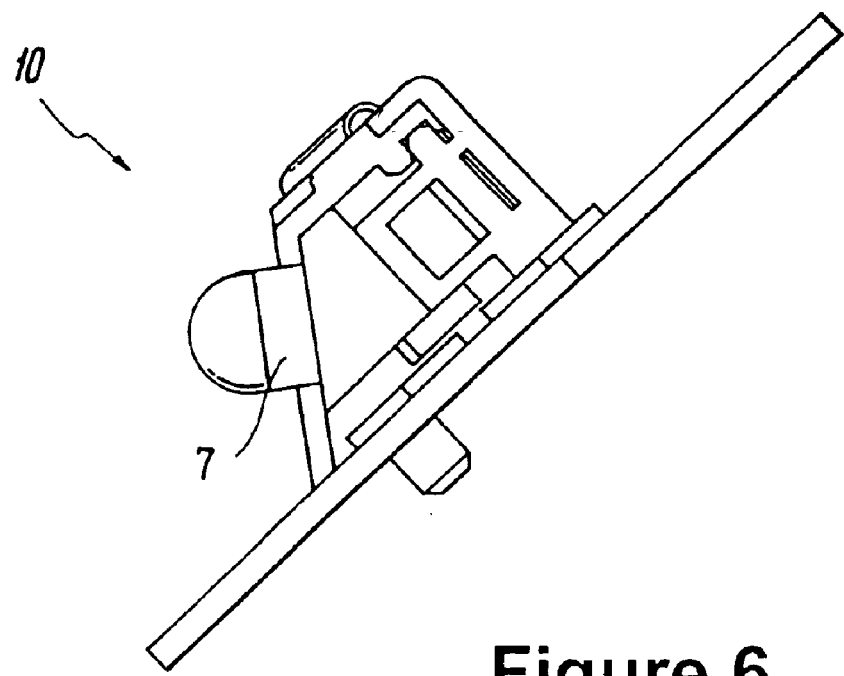
FIG. 6 is the same diagonal cutout view of FIG. 5 showing an alternative embodiment where the diffusive part of the optics has its outer edges exposed directly to light coming from the outside of the sensor.

Also optionally, this layer of diffusive material can be shaped and located so that its outer edges are directly exposed to incoming solar radiation, as illustrated on FIG. 6. This provides a second path for light to reach the sensing elements: either by the convex optical part, through the diffusive part and eventually to the sensing element, or directly by the edge of the diffusive part, through the diffusive part and to the sensing element. This alters the angular dependency of the output signal of the apparatus in a manner that may be advantageous for some applications, such as cases where it is desired that the output of a channel remain at some low, but non-zero, value even when the angular position of the sun is far on the side of the sensor opposite that corresponding to said channel. The solid curve on FIG. 12 illustrates how the output of the driver-side channel of the sensor varies with the angular azimuthal position of the sun, for one value of the elevation angle, for this alternative embodiment of the invention.

In its automotive application, the sensor 10 is mounted in a vehicle, generally on the dash board and under the windshield, so that the line joining the centers of the two photodiode sensing elements is approximately perpendicular to the longitudinal axis of the vehicle, and so that the surfaces of the sensing elements are approximately parallel to the surface over which the vehicle rests.

In operation, the sensor 10 is exposed to sunlight that penetrates the vehicle through the windshield. If the sun is located very close to the projection of the median plane of the car into the sky, the light strikes the two transparent convex areas at the same relative angle, and the same amount of light is brought to the two sensing elements. The two electrical outputs are then equal. If the sun moves to one side of the longitudinal plane, the shape of the transparent optical areas, and of the opaque wall that separates them, is such that the signal from the sensing element corresponding to the side where the sun is located remains approximately constant, while the signal of the opposite sensing element drops to near zero. In this manner the amplitude of the higher of the two output signals provides a measurement of the solar radiative power, while the ratio of, or the difference between, the two output signals provides information as to whether the sun is located on the left side or on the right side of the median plane of the vehicle.

In the optional implementation where light is allowed to enter the apparatus also through the edge of a diffusive plastic piece located at the base of the transparent convex plastic parts, the signal does not drop all the way to zero when the sun moves to the opposite side of the longitudinal plane, but to some low value.

The invention presents many advantages over prior art. It provides signals that are better suited to the control of the air conditioning of a car so as to provide optimum comfort to both the driver and the front-seat passenger. It can be manufactured economically thanks to the simplicity of its geometry.

Its output signals provide direct and separate information on the level of solar power entering the car, irrespective of the direction of the sky from which it is coming, and of the part of the sky in which the sun is located, either on the left or on the right of the longitudinal plane of the car. This is the information needed to properly control the air conditioning in a vehicle, the total sunload value indicating the overall degree of air conditioning needed, and the general angular position of the sun indicating whether the cold air should be preferentially directed at the driver side or at the passenger side.

Whereas other such apparatus provide this type of angular discrimination of the sun position by using two photodiode sensing elements mounted at an angle with one another, the sensor of the present invention does so by inclining the optical axes of the clear convex plastic parts of the housing instead. This allows for more economical fabrication of the sensing circuit, since all the elements, including the two photodiodes, can be mounted on a single flat substrate.

Whereas still other apparatus provide some angular discrimination of the sun position, and make use of two photodiode sensing elements mounted in the same plane, by the method of diffusing light through an appropriately shaped opalescent piece of plastic material, the apparatus described herein maintains a near constant signal output when the sun comes down very close to the horizon, in contrast with those other apparatus whose output signal typically drops significantly when the sun approaches the horizon by less than 20 degrees.

The concept of the present invention is such that the geometrical parameters of the clear optical regions, and of the optional diffusive areas, and of the opaque region that separates them, can be modified to adjust the manner in which the output per channel varies with the angular position of the sun, enabling the sensor to meet specific application requirements.

In one preferred embodiment of the invention, the circuit is mounted on a ceramic substrate and incorporates thick film resistors that can be trimmed by a laser beam so as to insure that the level of signal is equal from the two sensing elements when the sun is located in the longitudinal plane of the vehicle, and is also the same from one sensor to another for the same level of solar power, in spite of the variation in the intrinsic sensitivity of the photodiodes from chip to chip.

What is claimed is:

1. A dual sunload sensor to sense the intensity and directionality of solar radiative power entering the cabin of a vehicle through a windshield, said sensor comprising:
   a housing;
   a substrate bearing only two light sensitive semiconductor elements thereon housed in said housing;
   two optical lenses, one lens being located above one of said only two light sensitive semiconductor elements, the other lens being located over the other one of said only two light sensitive semiconductor elements, each of said optical lenses refracting light towards a the respective corresponding light sensitive semiconductor element; and
   an optically opaque wall separating said two optical lenses lying in a vertical plane along a longitudinal axis of the vehicle.

2. The sensor of claim 1 wherein said sensor further includes a light guide in the shape of a truncated cylinder between a base of each said optical lens and the corresponding light sensitive element for said lens.

3. The sensor of claim 1 further comprising a layer of light diffusive material added to a base of each said optical lens.

4. The sensor of claim 3, wherein the layer of light diffusive material consists of clear polymer in which grains of titanium dioxide are dispersed.

5. The sensor of claim 3, wherein the layer of light diffusive material has its edges at least partially exposed directly to incoming solar light.

6. The sensor of claim 1 wherein said light sensitive elements are silicon photodiodes.

7. The sensor of claim 1, further comprising passive electronic components mounted on the substrate along with said light sensitive elements for adjusting the electrical output of the sensor.

8. The sensor of claim 1 further comprising active electronic components mounted on the substrate along with said light sensitive elements and passive electronic components, for the purpose of amplifying and adjusting the electrical output of the sensor.

9. The sensor of claim 1, wherein each said optical lens has an optical axis inclined in a direction substantially corresponding to diagonals of cubes resting in the plane of said light sensitive elements.

10. The sensor of claim 1 wherein each said optical lens collects light reaching the housing substantially only from the portion of the housing on each side of the opaque wall that corresponds to the side of the vehicle divided along the longitudinal axis of the vehicle and the opaque wall.

11. The sensor of claim 10 wherein each said optical lens is of generally convex shape.

12. The sensor of claim 11 further comprising a light conducting element between each optical lens and its corresponding light sensitive semiconductor element.

13. The sensor of claim 10 wherein the optical axis of each lens in a direction corresponding substantially to the diagonals of virtual cubes resting in the plane of the light sensitive element with which the lens is associated.

14. The sensor of claim 1 wherein each lens collects substantially only light in the portion of the housing as separated by the opaque wall in which the lens is located.

* * * * *